United States Patent
Goering

(10) Patent No.: US 6,446,675 B1
(45) Date of Patent: Sep. 10, 2002

(54) MINIMUM DISTORTION 3D WOVEN PREFORMS

(75) Inventor: Jonathan Goering, York, ME (US)

(73) Assignee: Albany International Techniweave, Inc., Rochester, NH (US)

(*) Notice: Subject to any disclaimer, the term of this patent is extended or adjusted under 35 U.S.C. 154(b) by 0 days.

(21) Appl. No.: 09/899,328

(22) Filed: Jul. 5, 2001

(51) Int. Cl.[7] .............................................. D03D 41/00
(52) U.S. Cl. ................ 139/11; 139/383 R; 139/DIG. 1; 442/205
(58) Field of Search ............................... 139/11, 383 R, 139/384 R, DIG. 1; 442/203, 204, 205, 181

(56) References Cited

U.S. PATENT DOCUMENTS

| | | | | |
|---|---|---|---|---|
| 4,725,485 A | * | 2/1988 | Hirokawa | 139/DIG. 1 |
| 4,906,506 A | * | 3/1990 | Nishimura et al. | 139/383 R |
| 4,922,968 A | * | 5/1990 | Bottger et al. | 139/384 R |
| 5,064,705 A | * | 11/1991 | Donovan, Sr. | 156/227 |
| 5,100,713 A | * | 3/1992 | Homma et al. | 139/383 R |

* cited by examiner

Primary Examiner—Danny Worrell
Assistant Examiner—Robert H Muromoto, Jr.
(74) Attorney, Agent, or Firm—Frommer Lawrence & Haug LLP; Ronald R. Santucci

(57) ABSTRACT

A woven preform for a reinforced composite material which may be woven flat and folded into shape with the fibers at the fold being so woven so as to compensate for folding.

6 Claims, 4 Drawing Sheets

As-Woven

As-Folded

As-Woven

As-Folded

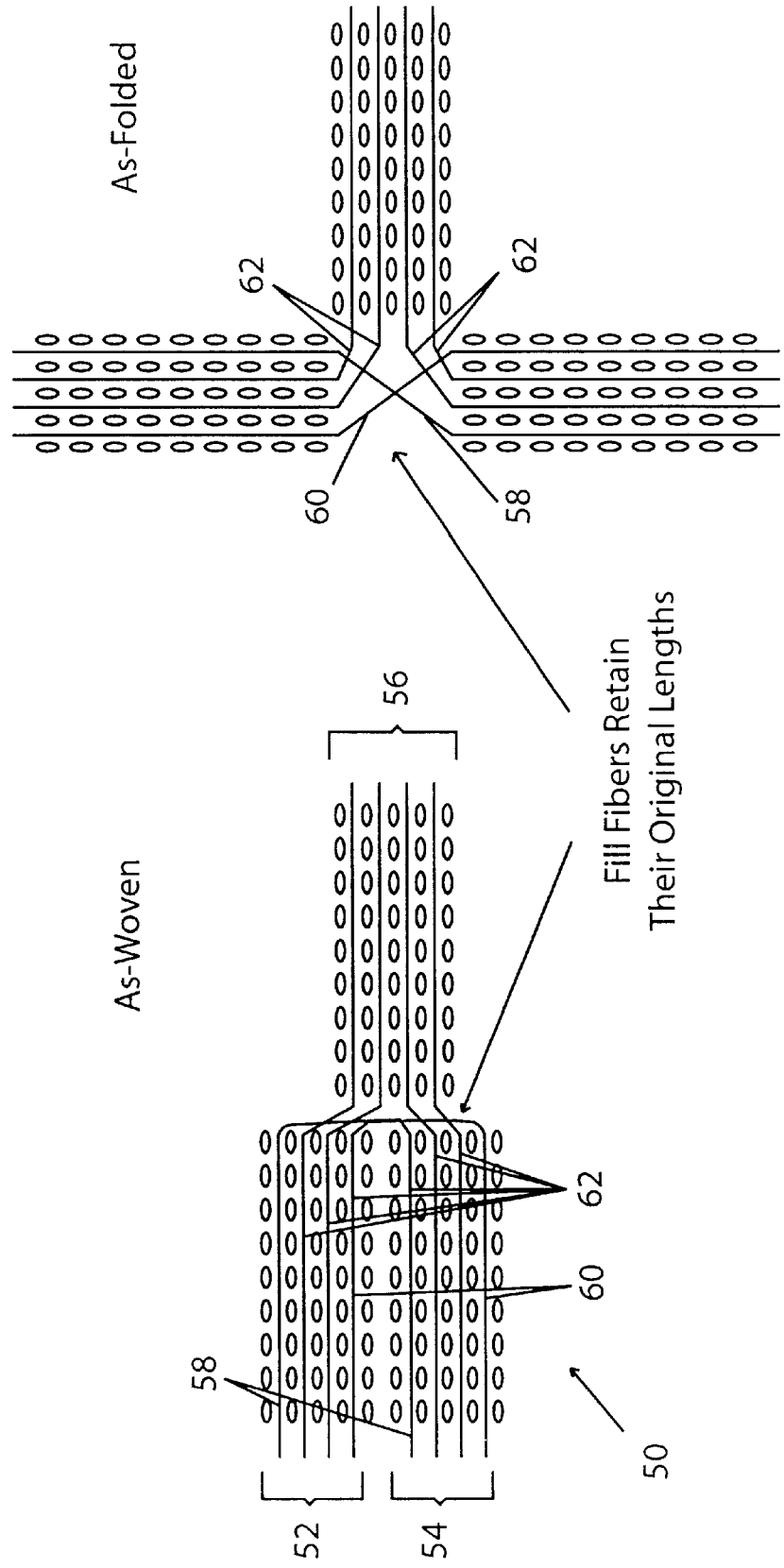
FIG. 4B  As-Folded
FIG. 4A  As-Woven
Fill Fibers Retain Their Original Lengths

MINIMUM DISTORTION 3D WOVEN PREFORMS

FIELD OF THE INVENTION

This invention relates to woven preform for a reinforced composite material which can be woven flat and folded into its final shape without producing undesirable distortion in the fibers.

BACKGROUND OF THE INVENTION

The use of reinforced composite materials to produce structural components is now widespread, particularly in applications where their desirable characteristics are sought of being light in weight, strong, tough, thermally resistant, self-supporting and adaptable to being formed and shaped. Such components are used, for example, in aeronautical, aerospace, satellite, battery, recreational (as in racing boats and autos), and other applications.

Typically such components consist of reinforcement materials embedded in matrix materials. The reinforcement component may be made from materials such as glass, carbon, ceramic, aramid (e.g., "KEVLAR"), polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials, such as very high strength, are imparted to the completed composite component. The constituent reinforcement materials typically, may be woven, knitted or otherwise oriented into desired configurations and shapes for reinforcement preforms. Usually particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, matrix material may be introduced to and into the preform, so that typically the reinforcement preform becomes encased in the matrix material and matrix material fills the intersticial areas between the constituent elements of the reinforcement preform. The matrix material may be any of a wide variety of materials, such as epoxy, polyester, vinyl-ester, ceramic, carbon and/or other materials, which also exhibit desired physical, thermal, chemical and/or other properties. The materials chosen for use as the matrix may or may not be the same as that of the reinforcement preform and may or may not have comparable physical, chemical thermal or other properties. Typically, however, they it will not be of the same materials or have comparable physical, chemical thermal or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note at this point that after being so cured, the then solidified masses of the matrix material normally are very strongly adhered to the reinforcing material (e.g., the reinforcement preform). As a result, stress on the finished component, particularly via its matrix material acting as an adhesive between fibers, may be effectively transferred to and borne by the constituent material of the reinforcing reinforcement preform.

Frequently, it is desired to produce components in configurations that are other than such simple geometric shapes as (per se) plates, sheets, rectangular or square solids, etc. A way to do this is to combine such basic geometric shapes into the desired more complex forms. One such typical combination is made by joining reinforcement preforms made as described above at an angle (typically a right-angle) with respect to each, other. Usual purposes for such angular arrangements of joined reinforcement preforms are to create a desired shape to form a reinforcement preform that includes one or more end walls or "T" intersections for example, or to strengthen the resulting combination of reinforcement preforms and the composite structure which it produces against deflection or failure upon it being exposed to exterior forces, such as pressure or tension. In any case, a related consideration is to make each juncture between the constituent components as strong as possible. Given the desired very high strength of the reinforcement preform constituents per se, weakness of the juncture becomes, effectively, a "weak link" in a structural "chain".

An example of an intersecting configuration is set forth in U.S. Pat. No. 6,103,337, the disclosure of which is incorporated herein by reference. This reference sets forth an effective means of joining together two reinforcing plates into a T form.

Various other proposals have been made in the past for making such junctures. It has been proposed to form and cure a panel element and an angled stiffening element separate from each other, with the latter having a single panel contact surface or being bifurcated at one end to form two divergent, co-planar panel contact surfaces. The two components are then joined by adhesively bonding the panel contact surface(s) of the stiffening element to a contact surface of the other component using thermosetting adhesive or other adhesive material. However, when tension is applied to the cured panel or the skin of the composite structure, loads at unacceptably low values resulted in "peel" forces which separate the stiffening element from the panel at their interface since the effective strength of the join is that of the matrix material and not of the adhesive.

The use of metal bolts or rivets at the interface of such components is unacceptable because such additions at least partially destroy and weaken the integrity of composite structures themselves, add weight, and introduce differences in the coefficient of thermal expansion as between such elements and the surrounding material.

Other approaches to solving this problem have been based on the concept of introducing high strength fibers across the joint area through the use of such methods as stitching one of the components to the other and relying upon the stitching thread to introduce such strengthening fibers into and across the juncture site. One such approach is shown in U.S. Pat. No. 4,331,495 and its method divisional counterpart, U.S. Pat. No. 4,256,790. These patents disclose junctures having been made between a first and second composite panels made from adhesively bonded fiber plies. The first panel is bifurcated at one end to form two divergent, co-planar panel contact surfaces in the prior art manner, that have been joined to the second panel by stitches of uncured flexible composite thread through both panels. The panels and thread have then been "co-cured": i.e., cured simultaneously.

Another method to improve upon junction strength is set forth in U.S. Pat. No. 5,429,853.

While the prior art has sought to improve upon the structural integrity of the reinforced composite and has achieved success, particularly in the case of U.S. Pat. No. 6,103,337, there exists a desire to improve thereon or address the problem through an approach different from the use of adhesives or mechanical coupling. In this regard, one approach might be by creating a woven three dimensional ("3D") structure by specialized machines. However, the expense involved is considerable and rarely is it desirable to have a weaving machine directed to creating a simple structure.

Another approach would be to weave a two dimensional ("2D") structure and fold it into shape. However, this typically results in parts that distort when the preform is folded. The distortion occurs because the lengths of fiber as-woven are different than what they should be when the preform is folded. This causes dimples and ripples in areas where the as-woven fiber lengths are too short, and buckles in the areas where fiber lengths are too long. These distortions cause undesirable surface anomalies and reduce the strength and stiffness of the component. While this may be relieved by cutting and darting, such procedure is undesirable, since it is labor intensive or otherwise may compromise the integrity of the preform.

As aforesaid, 3D preforms which can be processed into fiber reinforced composite components are desirable because they provide increased strength relative to 2D laminated composites. These preforms are particularly useful in applications that require the composite to carry out-of-plane loads.

Accordingly, there is a need for a 3D preform which provides for an alternative approach and/or an improved method of creating 3D preforms and/or reinforced composite structures.

SUMMARY OF THE INVENTION

It is therefore a principal object of the invention to provide for a 3D preform which is of a design which is an alternative to and/or an improvement on existing preforms and/or reinforced composite structures heretofore available.

It is a further object of the invention to provide for such a 3D preform which may be folded into shape without distortion of the fibers comprising the preform.

A yet further object of the invention is to provide for a 3D preform which is particularly useful in forming T-shaped reinforced composites.

These and other objects and advantages are achieved by providing for a 3D woven preform that can be woven flat and then folded into its final shape prior to impregnation of resin without producing an undesirable distortion in the fibers. This is accomplished by adjusting the length of the fibers during weaving such that so that some are too short in some areas and too long in others. The fibers are then equalized when the preform is folded into shape providing for a smooth transition at the fold. This technique, while particularly suited for form T-shaped woven preforms, may be utilized with various shapes. Also, while reference is made to woven preforms, its applicability to non-wovens, such as braided or stitched bonded, for example, will be apparent to one skilled in the art.

BRIEF DESCRIPTION OF THE DRAWINGS

Thus by the present invention its objects and advantages will be realized, the description of which should be taken and in conjunction with the drawings wherein:

FIGS. 4A and 4B are respective side sectional views of a woven fabric and as-folded having a different configuration, incorporating the teachings of the present invention.

DETAILED DESCRIPTION OF THE PREFERRED EMBODIMENT

Figure 1A:
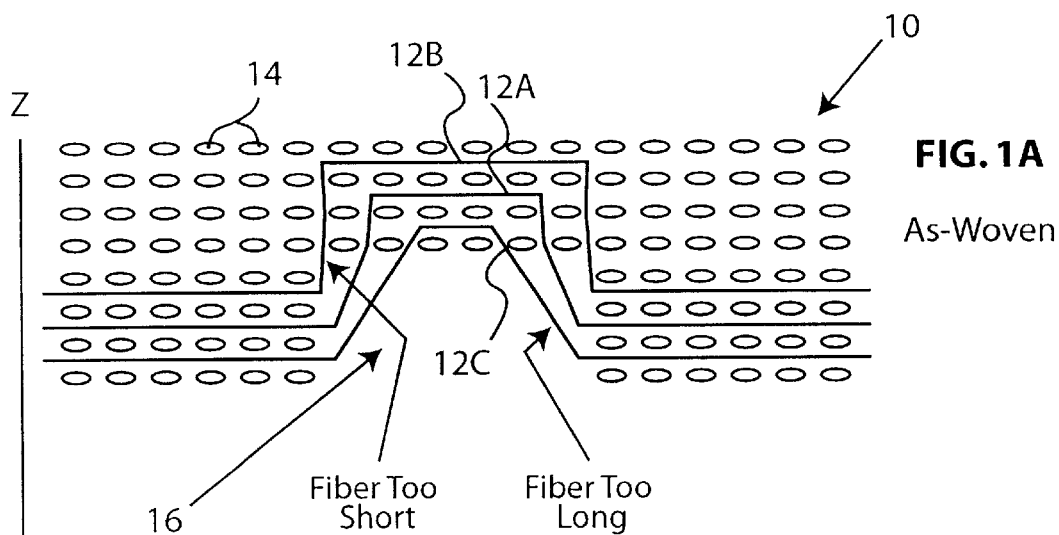
FIGS. 1A and 1B are respective side sectional views of a woven fabric as-woven and as-folded for use as a preform for a reinforced composite.

Turning now to the drawings in more detail, where like parts will be similarly numbered, in FIG. 1A there is shown a woven fabric 10 comprising fill or weft fibers 12A, B and C (for illustration purposes) and warp fibers 14. As aforesaid, the fabrics may be made from a variety of materials with, however, carbon or carbon based fiber typically utilized in aeronautical applications.

Figure 1B:
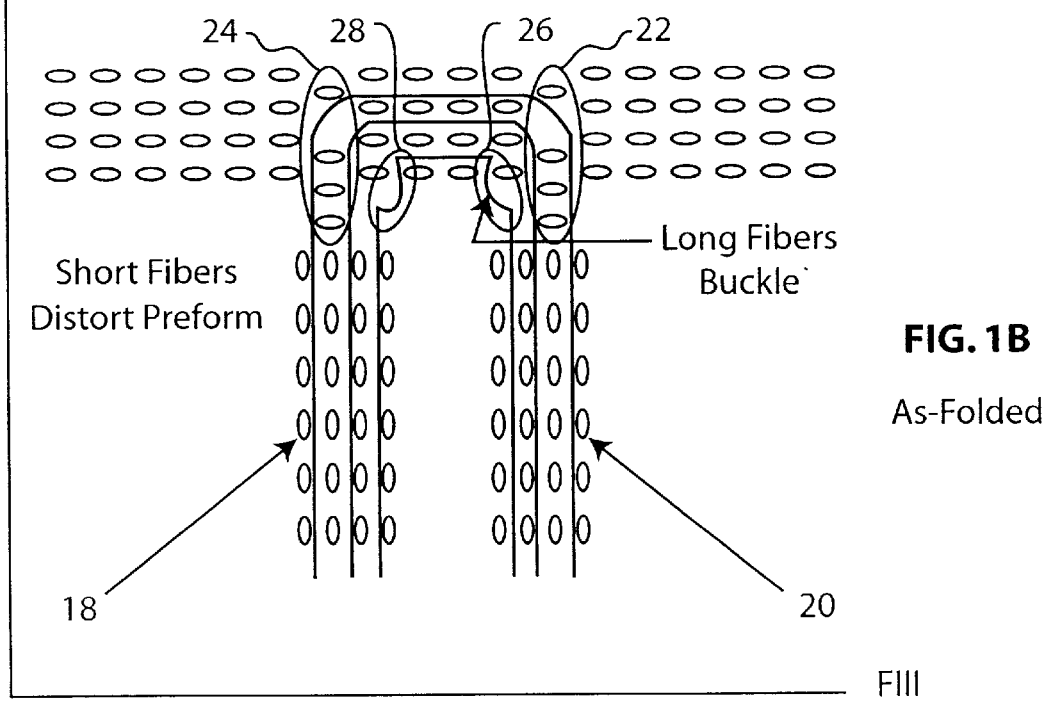

What is shown in FIGS. 1A and 1B might be considered a conventional approach to create a woven preform which may be folded into shape. In this regard, a space 16 is provided in the woven fabric where the lower four rows of warp fibers 14 are absent from the weave. This is to allow the adjacent portions or legs 18 and 20 of the fabric 10 to be folded perpendicular to the fabric 10 as shown in FIG. 1B.

The problem that results, however, is that, since the lengths of the weft fibers 12A, B and C are the same when woven flat and when folded, upon folding, this causes dimples or ripples in the areas 22 and 24 where the fibers 12B are too short and buckles in areas 26 and 28 where the weft fibers 12C are too long. The dimples or ripples in areas 22 and 24 occur since the weft fibers 12B which are too short upon folding cause the warp fibers to pull downward. In areas 26 and 28, since the weft fibers 12C are too long upon folding, they buckle outward. The foregoing results in undesirable surface anomalies and reduce the strength and stiffness of the component.

Figure 2A:
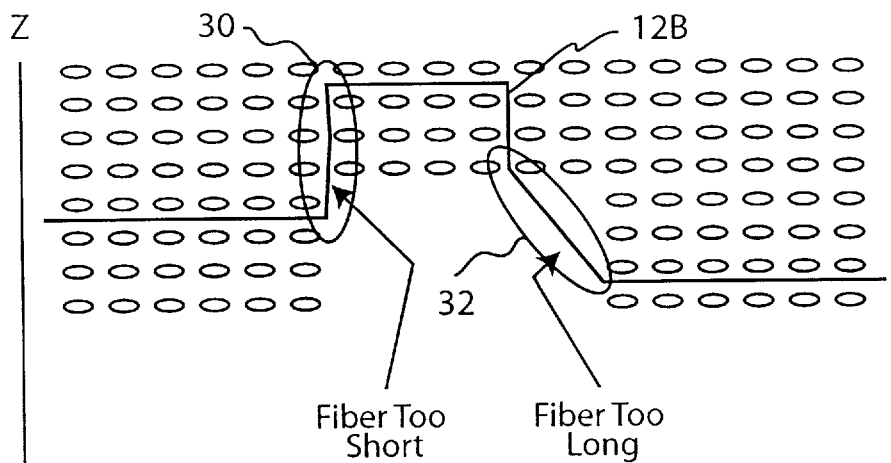
FIGS. 2A and 2B are respective side sectional views of a woven fabric as-woven and as-folded for use as a preform for a reinforced composite, incorporating the teaching of the present invention.
Figure 2B:
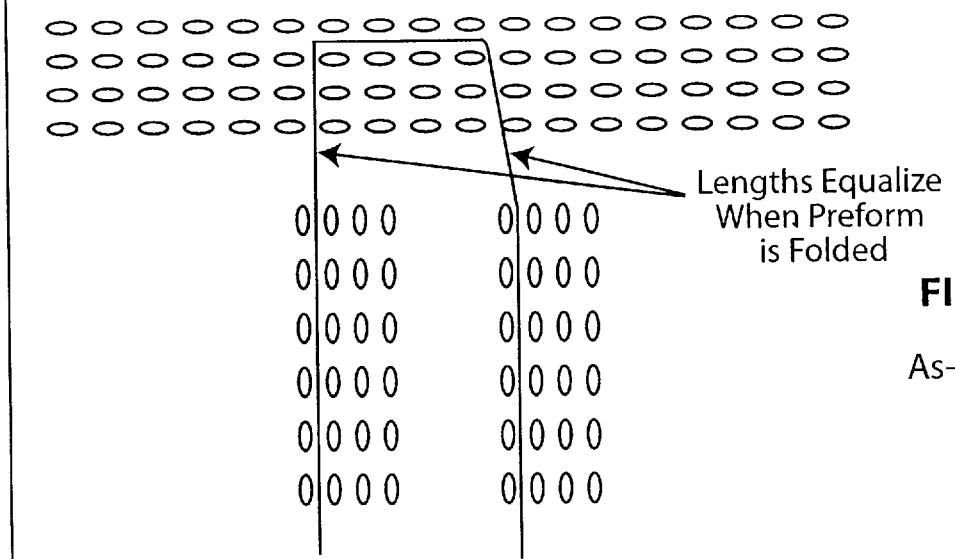

Turning now to FIGS. 2A and 2B, like parts are similarly numbered. As can be seen in FIG. 2A, weft fiber 12B', is shown merely for illustration purposes. Due to the differences in the length of the fiber in the as-woven (shown in Figure 2A) versus the as-folded (shown in FIG. 2B) the fiber lengths are woven too short in area 30 and too long in area 32. These differences in length are equalized when the preform is folded into shape so that the desired lengths are obtained. FIG. 2B shows the typical fiber path for a preform which, when folded, has a "pi" cross section. Fiber 12B' is intentionally woven in a path that renders it too short in area 30 and too long in area 32. This causes a tensioning in the short portion which, when folded into the "pi" shape, causes a drawing in of the long portion so that the fiber 12B' length on both sides is equal and correct in the folded portion and avoids the distortions and buckles as heretofore discussed.

Of course FIGS. 2A and 2B just illustrate the basic concept showing the use of a single fiber 12B. There would be many fibers along the length of the preform which would have the same fiber path. Also, there would be additional weft fibers woven in a similar manner to provide for the different lengths necessary depending upon their position in the weave, as will be discussed.

Figure 3A:
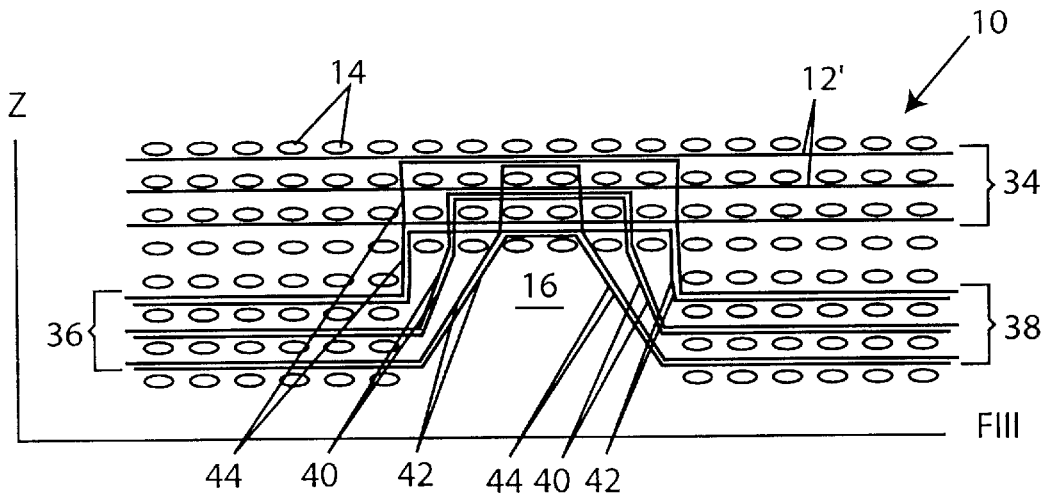
FIGS. 3A and 3B are respective side sectional views of a woven fabric as-folded illustrating a plurality of weft fibers at varying lengths, incorporating the teachings of the present invention.
Figure 3B:
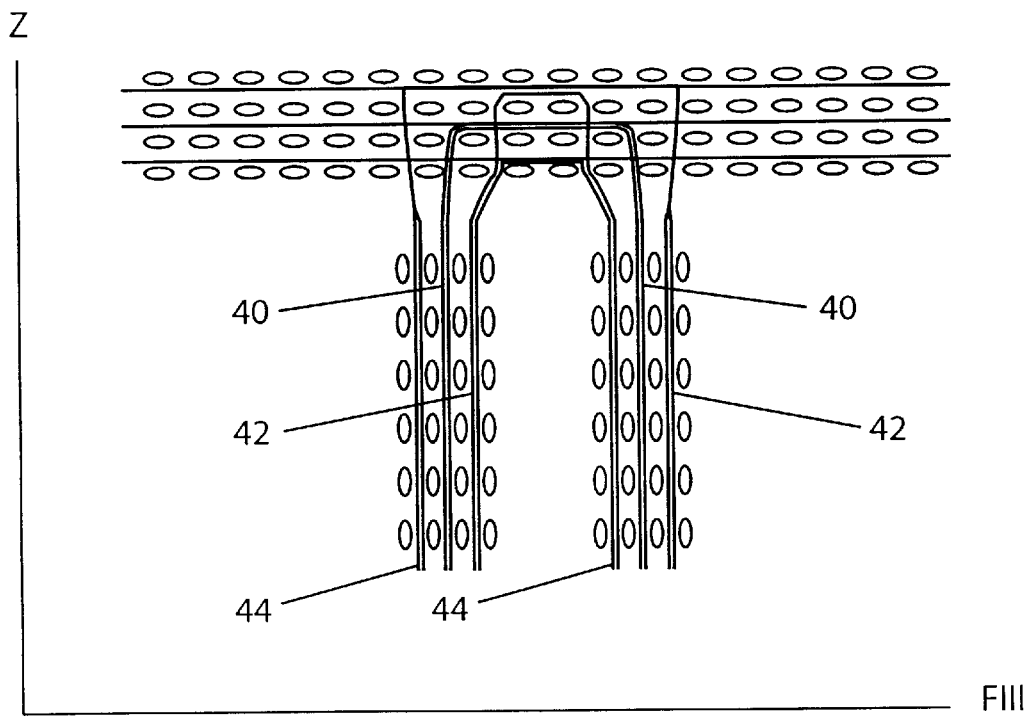

Turning now to FIGS. 3A and 3B, there is shown, respectively, fabric 10 as-woven and as-folded for a pi-shaped preform. The preform shape is for illustration purposes only, since the present invention can be implemented with regard to many shapes as will be apparent to one skilled in the art.

As shown, the top portion 34 of the fabric 10 of the pi preform comprises layers of warp fibers 14 land weft or fill fibers generally designated 12'. The leg portions 36 and 38 of the pi preform similarly comprise layers of warp fibers 14 and weft fibers 12. The fabric 10, as would be in the prior examples, is woven in a desired weave pattern (e.g. satin, etc.) suitable for the purpose. Also, as in the immediate prior example, the invention is directed towards eliminating distortions and buckles which would normally occur when going from a flat woven to a folded situation.

As can be seen in FIG. 3A, depending upon their position in the weave, this will determine the fiber path. For example, weft fibers 40 are of equal length on both sides of space 16, Fibers 42 are too long on the left hand side of FIG. 3A and too short on the right hand side. Similarly, fibers 44 are too short on the left hand side and too long on the right hand side.

Because of this, when the leg portions 36 and 38 are folded down as shown in FIG. 3B, the fiber lengths equalize in the same manner as discussed with regard to FIGS. 2A and 2B. Note that, the space between the leg portions 36 and 38 and the top portion 34 is exaggerated for illustration purposes.

Turning now to FIGS. 4A and 4B, there is shown a layout for making a T shaped preform 50.

FIG. 4A is the as-woven fabric with FIG. 4B being the as-folded fabric.

The top portion of the T is made up from two leg portions 52 and 54. The bottom of the T comprises portion 56. As in the earlier examples, the preform is woven in a desired pattern suitable for the purpose with, however, the modification of the weft fibers 58 so as to implement the advantages of the present invention. In this regard, fiber 58 is too long on the top and too short on the bottom. Fiber 60 is too short on the top and too long on the bottom. Fibers 62 are of equal length both top and bottom.

As shown in FIG. 4B, fibers 58 and 60 act as previously described due to the too long and too short fiber paths. They serve to interconnect portions 52 and 54. Fibers 62 serve to interconnect portions 52 and 54 with portions 56.

As in the case of all of the preforms of the present invention, once folded into shape, they can then be impregnated or coated with a resin to create the desired shaped composite structure.

Thus by the present invention its objects and advantages are realized and although preferred embodiments have been disclosed and described in detail herein, its scope should not be limited thereby rather its scope should be determined by that of the appended claims.

What is claimed is:

1. A two dimensional woven fabric for forming a structure having a three dimensional shape, said fabric comprising:
   a first portion of the fabric;
   a second portion of the fabric foldable with respect to the first portion;
   a plurality of yarns interconnecting the first and second portions;
   a yarn path defined by a yarn passing from said first portion to said second portion, said yarn path having a portion of yarn which is woven shorter than the path and a portion of yarn woven longer than the path such that upon folding of the first portion with respect to the second portion causes the portion of yarn which is woven shorter to draw in that portion of the yarn woven longer along the yarn path so as to compensate for folding.

2. The fabric according to claim 1, wherein the fabric includes warp and weft yarns and the interconnecting yarns are weft yarns.

3. The fabric according to claim 1, wherein the fabric is woven flat and said first and second portions are moveable with respect to each other to create a three dimensional shape.

4. The fabric according to claim 3, wherein said first and second portions are moveable to create a three dimensional shape is pi-shaped or T-shaped.

5. The fabric according to claim 4, wherein the fabric is in the shape of a preform for reinforcing a composite material.

6. The fabric according to claim 1, wherein said fabric has a plurality of woven layers in the first and second portions and a plurality of yarn paths are between different layers of the woven layers of the first and second portions.

* * * * *

UNITED STATES PATENT AND TRADEMARK OFFICE
CERTIFICATE OF CORRECTION

PATENT NO.     : 6,446,675 B1
DATED          : September 10, 2002
INVENTOR(S)    : Jonathan Goering It is certified that error appears in the above-identified patent and that said Letters Patent is hereby corrected as shown below:

Column 6,
Line 20, delete "yam" and insert -- yarn --
Line 22, delete "first" and insert -- second --
Line 23, delete "second" and insert -- first --
Line 28, delete "yams" and insert -- yarns --.

Signed and Sealed this

Twenty-eighth Day of January, 2003

JAMES E. ROGAN
*Director of the United States Patent and Trademark Office*